(12) United States Patent
Lin et al.

(10) Patent No.: US 8,957,597 B2
(45) Date of Patent: Feb. 17, 2015

(54) LUMINAIRE

(75) Inventors: Wen-Hsiang Lin, Taipei (TW); Po-Wei Li, New Taipei (TW); Chih-Chiang Kao, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 872 days.

(21) Appl. No.: 13/176,714

(22) Filed: Jul. 5, 2011

(65) Prior Publication Data

US 2012/0081005 A1    Apr. 5, 2012

(30) Foreign Application Priority Data

Sep. 30, 2010    (CN) .......................... 2010 1 0297583

(51) Int. Cl.
| | | |
|---|---|---|
| H05B 37/02 | (2006.01) | |
| H05B 33/08 | (2006.01) | |
| F21K 99/00 | (2010.01) | |
| F21S 9/02 | (2006.01) | |
| F21S 10/00 | (2006.01) | |
| F21V 23/04 | (2006.01) | |
| F21V 8/00 | (2006.01) | |
| F21V 29/00 | (2006.01) | |
| F21V 3/00 | (2006.01) | |
| F21Y 101/02 | (2006.01) | |
| G03B 21/20 | (2006.01) | |

(52) U.S. Cl.
CPC ........ *H05B 33/0803* (2013.01); *H05B 33/0842* (2013.01); *F21K 9/135* (2013.01); *F21K 9/58* (2013.01); *F21S 9/02* (2013.01); *F21S 10/00* (2013.01); *F21V 23/0485* (2013.01); *G02B 6/0068* (2013.01); *G02B 6/0076* (2013.01); *F21V 29/2206* (2013.01); *F21V 3/00* (2013.01); *F21Y 2101/02* (2013.01); *G03B 21/2033* (2013.01)
USPC .......................... 315/291; 315/302; 315/308

(58) Field of Classification Search
CPC .... H05B 37/00; H05B 37/02; H05B 33/0842; H05B 33/0803; F21V 23/0485; F21V 11/00; F21V 3/00; F21K 9/58; F21K 9/135; F21S 10/00; F21Y 2101/02; G03B 21/2033; G03B 6/0076; G03B 6/0068
USPC ..................................... 315/86, 362, 291, 653
See application file for complete search history.

(56) References Cited

U.S. PATENT DOCUMENTS

| | | | |
|---|---|---|---|
| 8,100,540 B2 * | 1/2012 | Huebner .......................... 353/94 |
| 2006/0181887 A1 * | 8/2006 | Chen .............................. 362/395 |
| 2007/0247840 A1 * | 10/2007 | Ham, II .......................... 362/227 |
| 2008/0024070 A1 * | 1/2008 | Catalano et al. ........... 315/185 R |
| 2010/0053942 A1 * | 3/2010 | Tarter et al. .................... 362/182 |
| 2010/0073960 A1 * | 3/2010 | Yang .............................. 362/612 |
| 2010/0165295 A1 * | 7/2010 | Feliciano ........................ 353/10 |
| 2010/0277067 A1 * | 11/2010 | Maxik et al. .................... 315/32 |
| 2010/0277316 A1 * | 11/2010 | Schlangen et al. ............ 340/540 |

* cited by examiner

*Primary Examiner* — Tuyet Vo
*Assistant Examiner* — Henry Luong
(74) *Attorney, Agent, or Firm* — Li & Cai Intellectual Property (USA) Office

(57) ABSTRACT

A luminaire is provided, which includes a first light source for providing an illumination light and a second light source passing through at least one image pattern for providing a patterned light. The first light source and the second light source are coupled to a driving circuit and covered by a lamp cover. The driving circuit is used to selectively drive at least one of the first light source and the second light source for providing the illumination light and/or the patterned light. A user may turn on or switch different patterns by touching a casing of the luminaire.

19 Claims, 12 Drawing Sheets

US 8,957,597 B2

LUMINAIRE

BACKGROUND OF THE INVENTION

1. Field of the Invention

The present invention relates to a luminaire; in particular, the present invention relates to a luminaire enabling pattern display function.

2. Description of Related Art

The Light Emitting Diode (LED) is a sort of semi-conductive component which releases energy in the form of photons when electrons fall into the valence band from the conduction band. An LED is composed of a P-typed and an N-typed semi-conductive material, which may emit spontaneous radiations in the ultraviolet, visible light and infrared regions.

Since the LED advantageously demonstrates various benefits, such as power saving, extended life span, high luminance etc., consequently, following the global trend of energy-saving and carbon reduction, at present it has been more and more comprehensively applied in many fields; for example, the traffic signage, road lamp, flashlight, backlight module in the LED display, luminaire and so forth.

SUMMARY OF THE INVENTION

The present invention provides a luminaire which is internally installed with the light source for projecting an image pattern onto the lamp cover of the luminaire. A user may turn on or switch different patterns by touching the casing (e.g., the heat sink) of the luminaire, or else adjust the brightness of the luminaire through rotating the lamp cover thereof thereby facilitating the convenience of use.

In summary, the luminaire provided by the present invention may create an image related to the image pattern on the lamp cover in an approach of projection and allow a user to switch the image related to the image pattern by touching the luminaire. Additionally, the user may also adjust the luminance of the lamp by rotating the lamp cover. Therefore, the luminaire according to the present invention can significantly elevate the added value of luminaire.

In order to facilitate better appreciation of the aforementioned features and advantages provided by the present invention, the preferred embodiments of the present invention, in conjunction with appended drawings thereof, are hereunder illustrated for further detailed descriptions.

DETAILED DESCRIPTION OF THE PREFERRED EMBODIMENTS

Figure 1A:
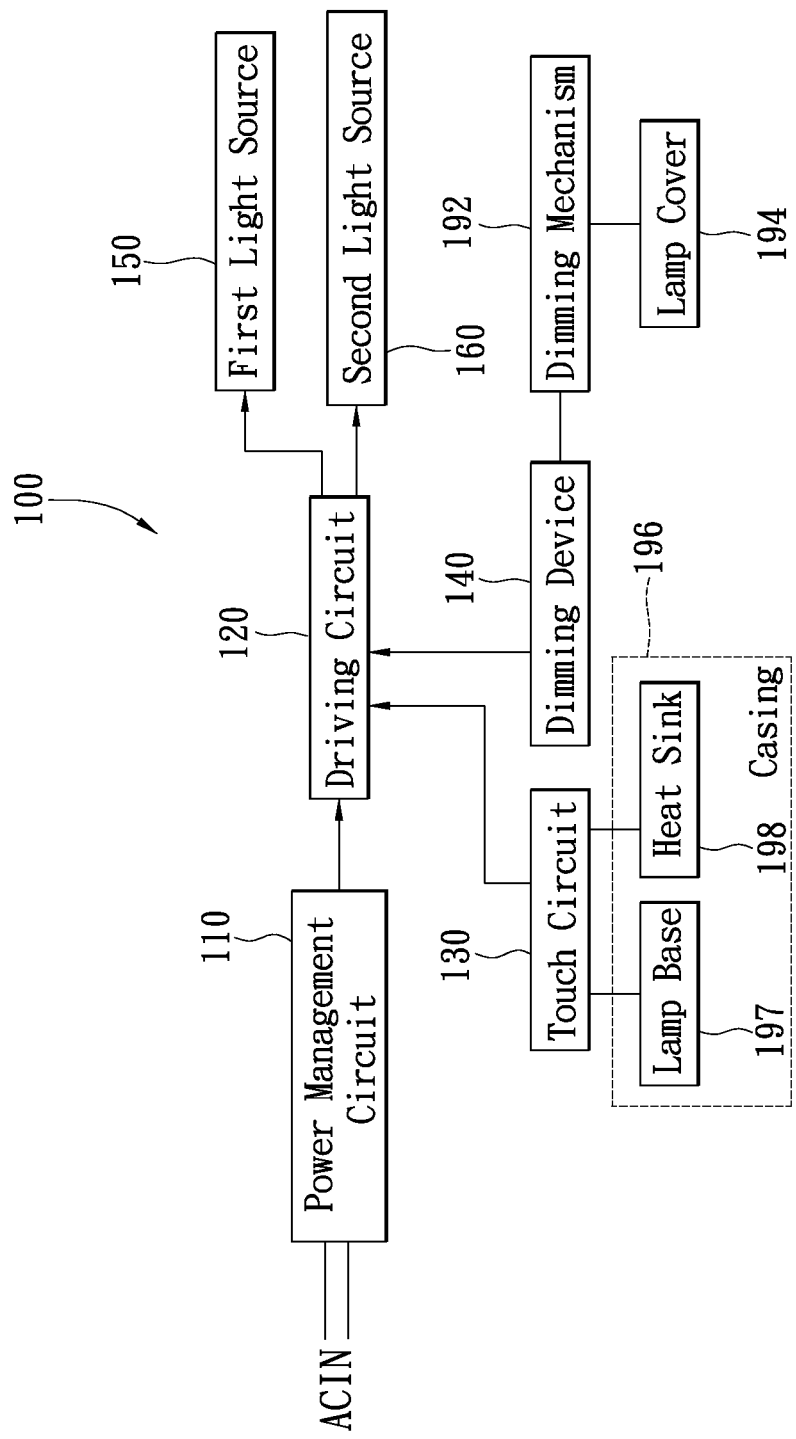
FIG. 1A shows a functional block diagram for a luminaire according to the present invention.

In the following texts, the present invention will be described in details by means of the embodiments of the present invention in conjunction with the drawings thereof, wherein the same reference numerals are applied to refer to the functionally equivalent or similar components.

Refer initially to FIG. 1A, wherein a functional block diagram for a luminaire according to the present invention is shown. The luminaire 100 comprises a power management circuit 110, a driving circuit 120, a touch circuit 130, a dimming device 140, a first light source 150, a second light source 160, a dimming mechanism 192, a lamp cover 194 and a casing 196. In case that the luminaire 100 is a luminaire composed of Light Emitting Diodes (LEDs), then the casing 196 typically comprises a lamp base 197 and a heat sink 198. Regarding the perspective of the luminaire 100, the main body thereof includes a lamp cover 194 and a casing 196, while the rest of the aforementioned components are disposed inside the luminaire 100. The driving circuit 120 is coupled to the power management circuit 110, the touch circuit 130, the dimming device 140, the first light source 150 and the second light source 160.

The heat sink 198 in the casing 196 is electrically connected to the touch circuit 130 as the conductor for detecting the touch of the user's hand. Certainly, it is also possible to apply other metal portions on the casing 196 to act as the conductor for touch detection, e.g., the lamp base 197, but the present invention is not limited thereto. The lamp cover 194 of the casing is rotatable connected onto the casing 196, and the dimming mechanism 192 is coupled to the dimming device 140 and the lamp cover 194, so the rotation of the lamp cover 194 may drive the dimming mechanism 192 and the dimming device 140, thereby causing the driving circuit 120 to adjust the luminance of the luminaire 100. The power management circuit 110 is used to convert a received alternating current, ACIN, into a direct current power source for the use by the driving circuit 120.

In the present embodiment, the first light source 150 and the second light source 160 may comprise the light emitting diodes (LEDs), and the luminaire 100 may include more than one first light source 150 and more than one second light source 160, depending on design requirements, and the present invention is not limited thereto.

The first light source 150 and the second light source 160 in the present invention may be implemented by means of various types of LED, such as the direct current LED (DC LED), alternating current LED (AC LED), organic LED (OLED) and the others. Taking the AC LED for example, when the first light source 150 and the second light source 160 are embodied as AC LEDs, the driving circuit 120 may be directly coupled to the AC power ACIN and drive the first light source 150 and the second light source 160 by directly applying the AC power ACIN thereto. Different types of LED may be employed in conjunction with various driving circuits for driving, and those skilled in the art may infer to other possible implementations after reviewing the descriptions for the aforementioned embodiment which are herein omitted for brevity.

Figure 1B:
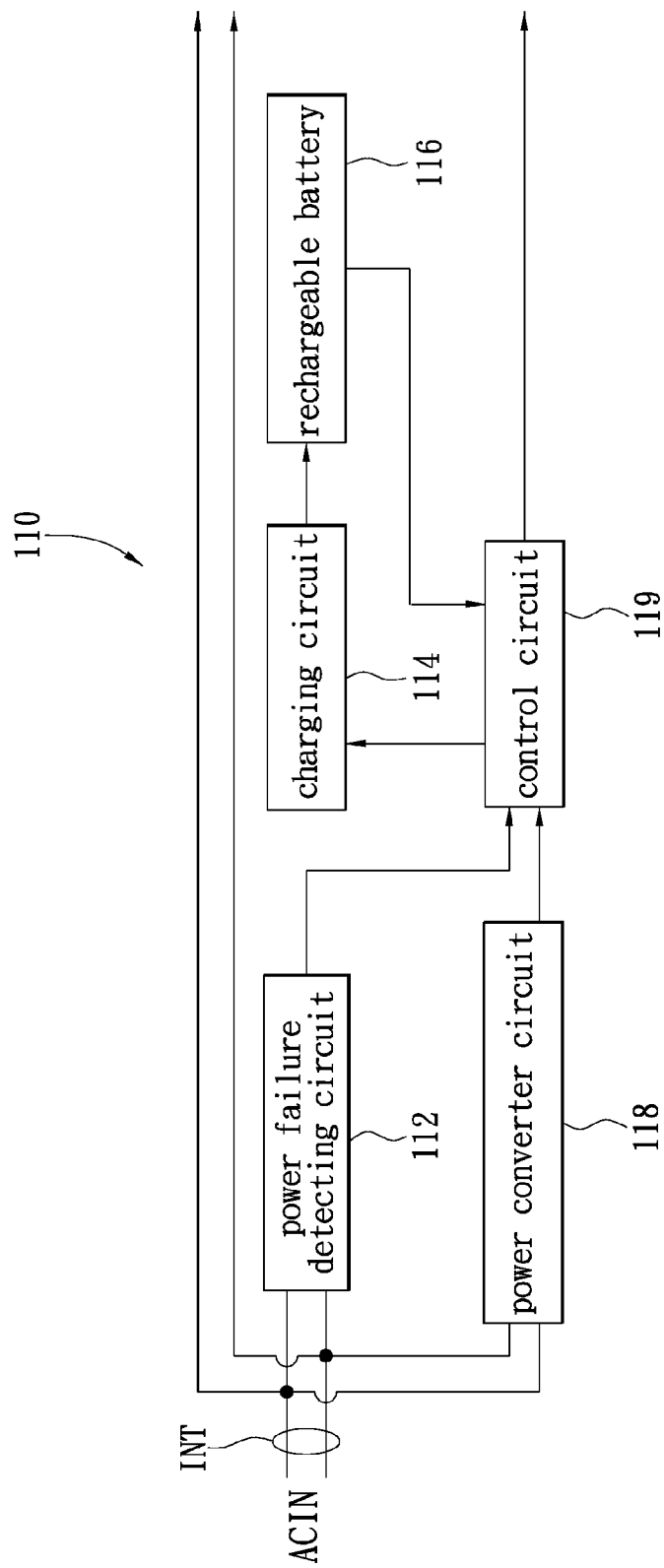
FIG. 1B shows a functional block diagram of the power management circuit 110 according to the present invention.

Please refer to FIG. 1B, which shows a functional block diagram of the power management circuit 110 according to the present invention. The power management circuit 110 comprises a power failure detecting circuit 112 for detecting an external power supply status, a charging circuit 114, a rechargeable battery 116, a power converter circuit 118 for converting AC power to DC power, and a control circuit 119. The control circuit 119 is coupled to the power failure detecting circuit 112, the charging circuit 114, the rechargeable battery 116, and the power converter circuit 118 for controlling operations of the power management circuit 110. The power management circuit provides power to the driving circuit 120 through the power converter circuit 118 responsive to the external power supply on and provides power to driving circuit 120 through the rechargeable battery 116 responsive to the external power supply off.

The luminaire 100 can receive an AC power ACIN through the power input terminal INT. The power failure detecting circuit 112 is coupled to the power input end terminal for detecting power availability. The power converter circuit 118 is coupled between the power input terminal INT and the control circuit 119 so as to convert the received AC power ACIN through the power input terminal INT into a DC power for usage by the control circuit 119.

The power failure detecting circuit 112, the rechargeable battery 116, and the control circuit 119 can be used to detect if the power is off and switch the power supply of the driving circuit 120. The power failure detecting circuit 112 can be used to inspect if the AC power ACIN is off service (external power supply status) and provide an inspection result to the control circuit 119. The power converter circuit 118 would convert the AC power ACIN into DC power for the control circuit 119. The power failure detecting circuit 112 has multiple implementations. For example, two resistors in series can be included in the power failure detecting circuit 112, wherein the resistors are coupled between the power input terminal INT and the ground. Then, voltage division is applied to obtain a fractional voltage of the AC power ACIN. By observing the change of the fractional voltage, power availability can be determined accordingly. In another implementation, the power failure detecting circuit 112 can include a resistor having a large resistance connected in parallel to the power input terminal INT. By observing the change in voltage or current of the AC power ACIN, the power availability can be determined. In particular, many techniques exist for power failure inspection. Therefore, the power failure detecting circuit is not restricted to the above descriptions.

The rechargeable battery 116 serves as a potential DC power source for the control circuit 119. Based on the detection result outputted by the power failure detecting circuit 112, the control circuit 119 would determine to use the rechargeable battery 116 or the power converter circuit 118 in providing power to the driving circuit 120. When the AC power ACIN is being supplied normally, the control circuit 119 would switch the power to be supplied by the power converter circuit 118, such that the power source of the driving circuit 120 comes from the AC power ACIN. When the power failure detecting circuit 112 detects a power failure (i.e., the AC power ACIN is off), the control circuit 119 would switch the power source to the rechargeable battery 116 instead, such that the power source of the driving circuit 120 comes from the rechargeable battery 116.

In this manner, regardless the condition, the luminaire 100 can be powered all the time to illuminate the LED. Since the luminaire 100 is equipped with the rechargeable battery 116, the user can remove the luminaire 100 off the lamp seat temporarily for emergency use, which is very useful during a power outage. In addition, when the rechargeable battery 116 is low in power, the control circuit 119 can recharge the rechargeable battery 116 by the charging circuit 114. There is no restriction for the charging period by the charging circuit 114 to the rechargeable battery 116. As long as the AC power supply is available, the charging circuit 114 can recharge the rechargeable battery 116 any time. In particular, the control circuit 119 would supply the power outputted by the power converter circuit 118 to the charging circuit 114, such that the charging circuit 114 can charge the rechargeable battery 116. The connection relationship among the aforementioned charging circuit 114, the control circuit 119, and the power converter circuit 118 may be adjusted according to the requirements, therefore is not restricted to FIG. 1B. The abovementioned connection relationship includes direct and indirect coupling, wherein the instant disclosure is not restricted regarding thereof.

Figure 2A:
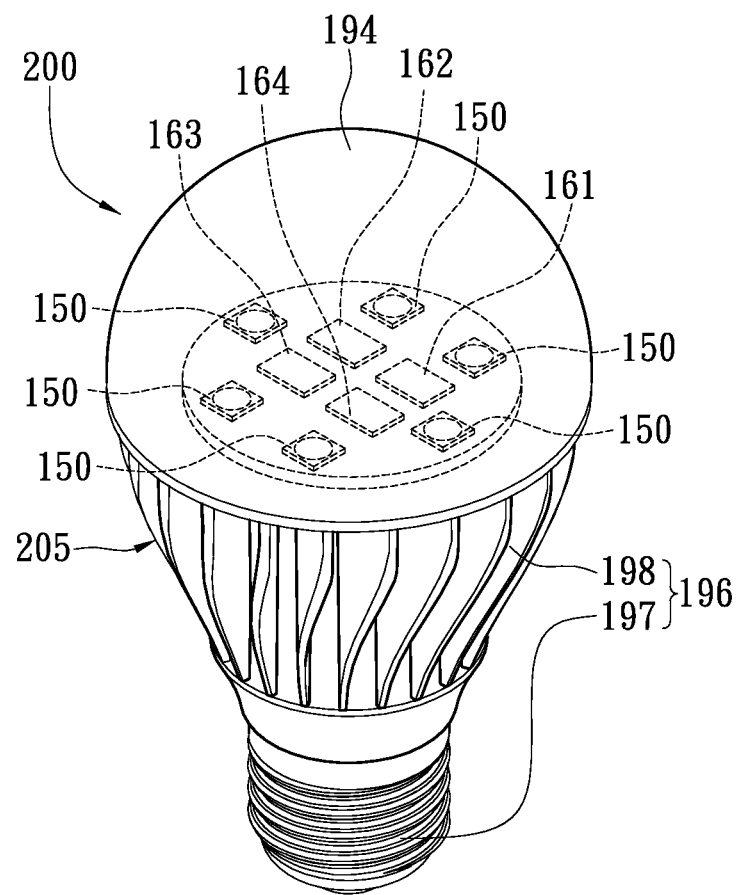
FIGS. 2A and 2B respectively show structural diagrams for the luminaire according to different embodiments of the present invention.
Figure 2B:
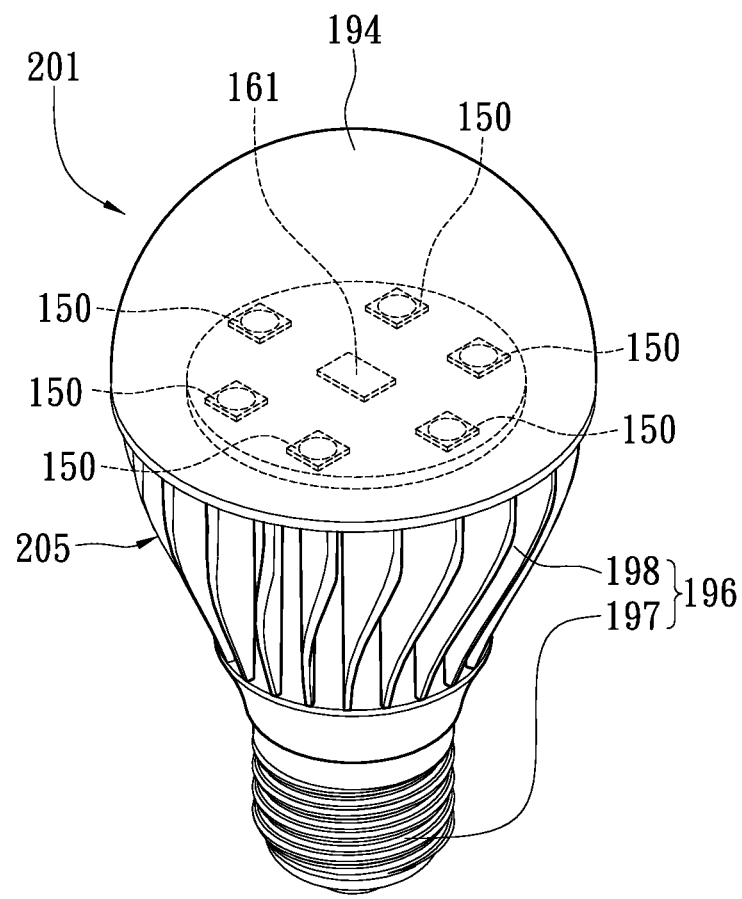

Refer next to FIGS. 2A and 2B, wherein structural diagrams for the luminaire according to different embodiments of the present invention are respectively shown. To facilitate more compact illustrations, in the following descriptions, all luminaire structures exemplarily use the lamp as the light source; but the present invention is by no means limited thereto, and other types of lighting devices may be utilized as well, such as a tube, a down light or a par light and so forth.

Refer to FIG. 2A, wherein the main body 205 of the lamp 200 comprises a lamp cover 194, a casing 196, a plurality of first light sources 150 and a plurality of second light sources 161~164. The first light sources 150 are essentially used to provide lighting, while each of the second light sources 161~164 corresponds to a different image pattern. The second light sources 161~164 may project the corresponding image pattern onto the lamp cover 194.

A driving circuit 120 is coupled to the first light sources 150 and second light sources 161~164 for driving the first light source 150 or selectively driving one or more of the second light sources 161~164 to switch the image related to the image pattern projected onto the lamp cover 194. In the present embodiment, the driving circuit 120 is a multi-channel driving control circuit which allows to respectively control multiple first light sources 150 and multiple second light sources 161~164 thereby achieving the effects of individual control and dimming. The aforementioned multi-channel driving control circuit provides multiple independent output currents for driving multiple LEDs, and is able to respectively adjust the magnitude of the output current in order to individually alter the luminance emitted by each LED.

It should be noted that the first light sources 150 typically can be the white-light LED, and the second light sources 161~164 are usually colored light sources; e.g., a lighting source composed of LEDs providing three color lights (red, green and blue, RGB) or, otherwise, LEDs of one single color, thus enabling projections of color patterns by the second light sources 161~164. The present invention does not restrict the component type or color in the first light sources 150 and the second light sources 161~164, so long as the generated image pattern can be effectively distinguished.

In the above-stated descriptions, the lamp 200 has multiple second light sources 161~164; however, in another embodiment, the lamp 200 may be installed with only one second light source 161. Refer now to FIG. 2B, wherein the main body 205 of the lamp 201 comprises a casing 196, a lamp cover 194, a plurality of first light sources 150 and a second light source 161, wherein the plurality of first light sources 150 and the second light source 161 are installed inside the main body 205. The lamp 201 is provided with a touch circuit 130 as shown in FIG. 1A thereby controlling the activation and deactivation of the first light source 150 and the second light source 161. Hence, a user may determine whether to activate the second light source 161 through touching the heat sink 198 of the lamp 200 in order to project an image onto the lamp cover 194. In addition, it should be noted that the touch circuit 130 may be also configured to control the activation and deactivation of the first light sources 150, but the present invention is not limited thereto. Furthermore, the aforementioned functions regarding to image pattern switching, image pattern activation/deactivation etc. may be cyclically enabled, so the user's touch on the lamp can not only switch the image pattern but turn on or turn off the image pattern as well. After reviewing the illustrations previously set forth, those skilled in the art may conveniently infer to the implementations thereof which will be herein omitted for brevity.

Figure 3:
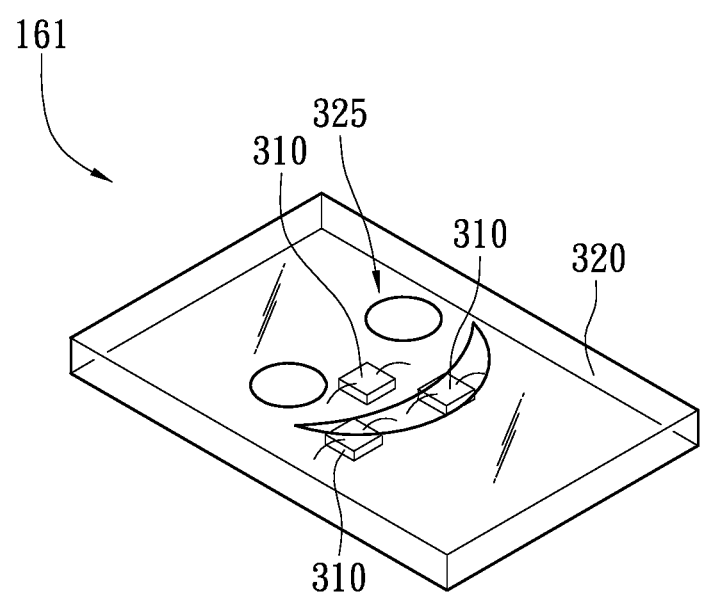
FIG. 3 shows a structural diagram for a second light source according to an embodiment of the present invention.

Refer next to FIG. 3, wherein a structural diagram for a second light source 161 according to an embodiment of the present invention is shown. The second light source 161 mainly comprises multiple LED dies 310 (each generating the red (R), green (G), blue (B) light) and a package structure 320, wherein the package structure 320 is used to package the LED die 310 and has an image pattern 325, e.g., a smiling face symbol, corresponding to the multiple LED dies 310 thereon. The image pattern 325 is directly formed on the top of the package structure 320, and may be enlarged and projected onto the lamp cover 194 as the multiple LED dies 310 emitting light. Furthermore, in addition to direct projection of the image related to the image pattern 325 onto the package structure 320 of the multiple LED dies 310, it is also possible to implement other embodiments capable of projecting the image related to the image pattern onto the lamp cover 194. Certain embodiments will be illustrated in the following paragraphs but the present invention is not limited thereto.

Figure 4:
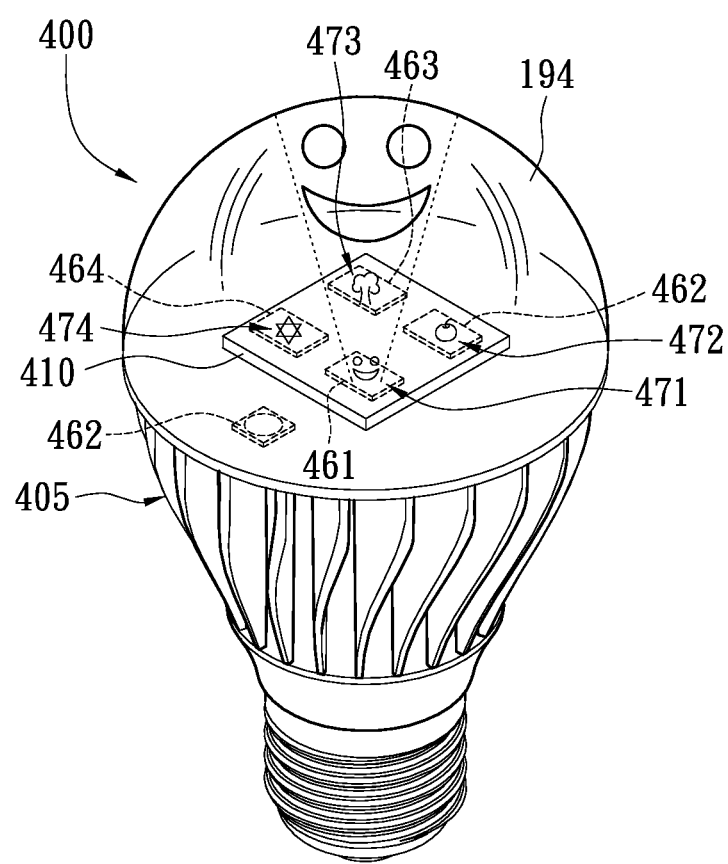
FIG. 4 shows a structural diagram for a luminaire according to another embodiment of the present invention.

FIG. 4 shows a diagram for an embodiment of a luminaire projecting the image related to the image pattern onto the lamp cover 194. A card 410 in the main body 405 of the lamp 400 is disposed over the second light sources 461~464 and has a plurality of image patterns 471~474 corresponding to the position and the second light sources 461~464. When the second light source 461 generates light, its corresponding image pattern 471 is projected onto the lamp cover 194. Therefore, a user may directly project a different image pattern 471~474 by turning on a different second light source 461~464. In addition, the lamp 400 of the present embodiment may be installed with a touch circuit 130 as shown in FIG. 1A, so the user may cause the driving circuit 120 to selectively drive different second light sources through touching the casing 196 (e.g., touching the heat sink 198), thereby enabling the projection of different image related the image pattern onto the lamp cover 194. Outside of the card 410, at least one first light source 462 may be also installed inside the lamp 400 to provide the general lighting function. Besides, in other possible embodiments, the card 410 may have only one image pattern (not shown), so that the only one image related to said image pattern is projected onto the lamp cover (not shown).

Figure 5:
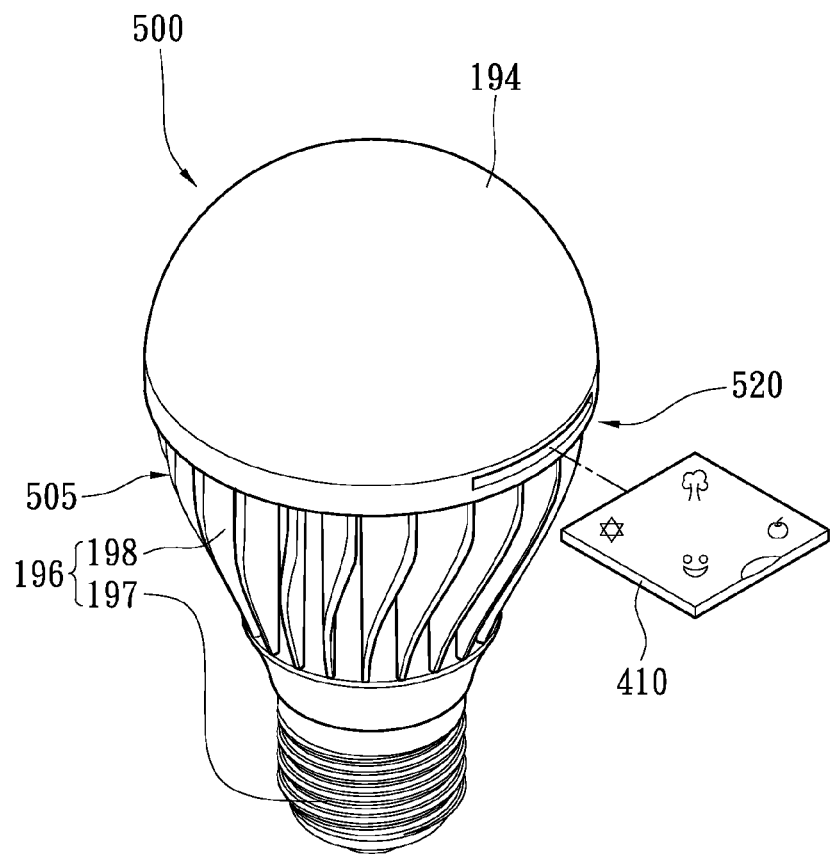
FIG. 5 shows a diagram for the card replacement, as depicted in FIG. 4.

In addition to switching different image patterns through a touching operation, the user may also project a different image by way of replacing the card 410 in other possible embodiments. Refer next to FIG. 5, wherein the main body 505 of the lamp 500 essentially comprises a casing 196 and a lamp cover 194, and a card slot 520 is configured on the casing 196. The user may replace a different card 410 through the card slot 520 so as to project the different image related to the image pattern onto the lamp cover 194. The card 410 may provide multiple image patterns and the inserted card 410 is located above the second light source 461, as shown in FIG. 4.

The user may insert a card having other patterns in order to project the different image related to the image pattern onto the lamp cover 194. Also, the number of second light sources in the present embodiment may be identical to the one of the image patterns on the card 410, as shown in FIG. 4. Afterward, a different second light source may be controlled to emit light by means of touching thus projecting a different image related to the image pattern onto the lamp cover 194. Or, alternatively, in other possible embodiments, there is only one single image pattern on the card 410; in this case, it needs simply one second light source (not shown) to provided the patterned light.

Figure 6A:
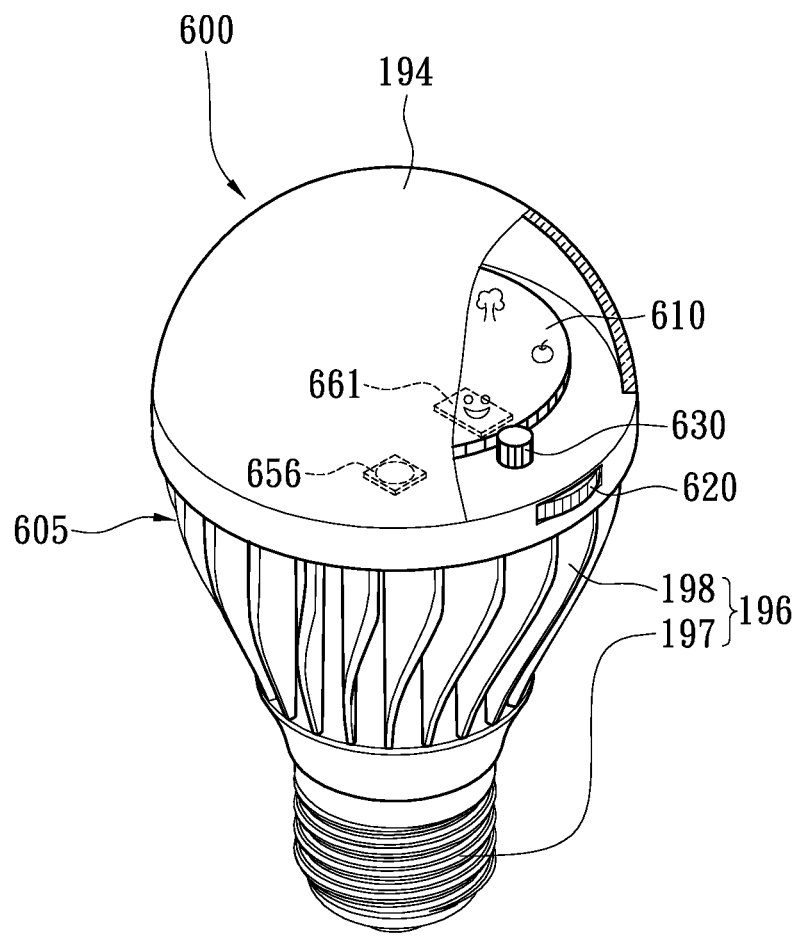
FIGS. 6A and 6B respectively show diagrams for different embodiments of image pattern switching according to the present invention.
Figure 6B:
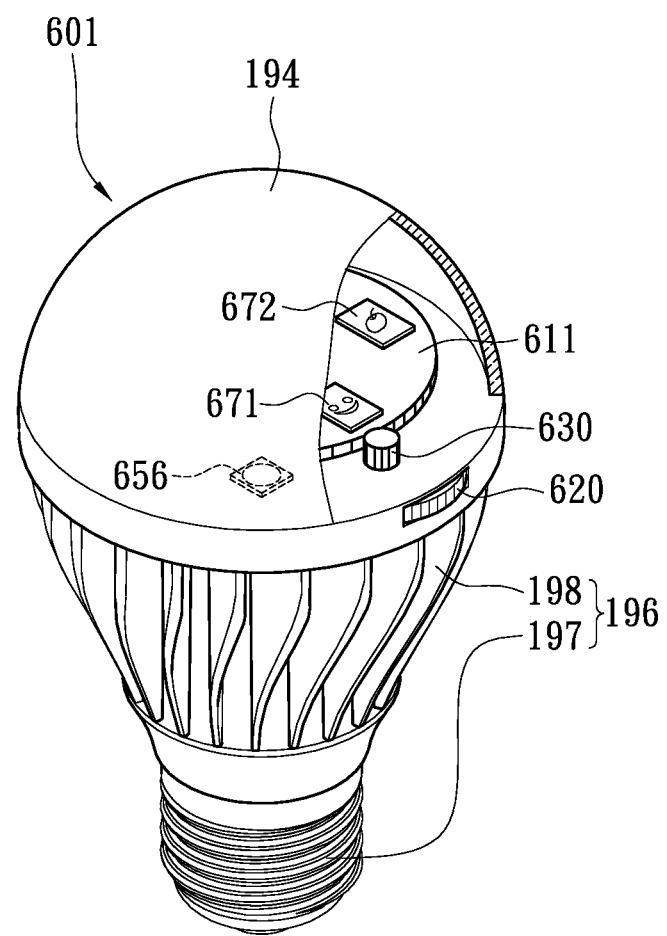

FIGS. 6A and 6B respectively show diagrams for different embodiments of image pattern switching according to the present invention. Except using the aforementioned replacement or touching control for image pattern switching, the present invention may also use a mechanism to rotate a rotary tray 610 including image patterns so as to switch the image pattern projected by and over the second light source 661.

Refer to FIG. 6A, wherein the main body 605 of the lamp 600 basically comprises a casing 196 and a lamp cover 194, wherein the casing 196 has a rotary tray 610 and a rotary element 620. The rotary element 620 is connected to the rotary tray 610 via a rotating shaft 630. Multiple different image patterns may be configured on the rotary tray 610 and such image patterns may be rotated over the top of the second light source 661 for projection, as the card 410 shown in FIG. 4. The rotary tray 610 is installed inside the casing 196 and located above the second light source 661, thereby the luminous second light source 661 may project the corresponding image onto the lamp cover 194. The rotary element 620 is partially exposed to the outside of the casing 196 thus allowing the user to rotate the rotary element 620, bringing the rotary tray 610 to rotate via the rotating shaft 630 so as to adjust the position of the image pattern. Then in conjunction with the touch circuit 130 illustrated in FIG. 1A, the second light source 661 may be turned on, so it is possible to switch the image pattern projected onto the lamp cover 194. In addition to the rotary tray 610, at least one first light source 656 may be disposed in the lamp 600 for the purpose of general lighting.

It should be noted that, in the present embodiment, the effect of image pattern switching may be achieved through installation of only one set of second light source 661 (comprising three LEDs of R/G/B lights or LEDs of single color) within the lamp 600. When the rotary tray 610 rotates to make a certain image pattern corresponding to the second light source 661, a corresponding image will be created and projected onto the lamp cover 194. FIG. 6A simply depicts an embodiment of the present invention, those skilled in the art may conveniently infer to other possible implementations through the above-said descriptions which are herein omitted for brevity. It is noted that, in FIG. 6A, the second light source 661 does not require image patterns disposed thereon, and the rotary tray 610 does not require light sources (LED chips) disposed thereon.

In another embodiment of the present invention, the second light source 161 shown in FIG. 3 may be combined with the rotary tray 610 in FIG. 6A thereby directly installing second light sources respectively having a different image pattern on the rotary tray. Refer to FIG. 6B, wherein a structural diagram for a lamp according to another embodiment of the present invention is shown. The difference between FIG. 6A and FIG. 6B mainly lies in that, in FIG. 6B, the second light sources 671, 672 with image patterns are directly disposed on the rotary tray 611, and in FIG. 6A, the rotary tray 610 does not require light sources (LED chips) disposed thereon. The user may rotate the rotary tray 611 by means of the rotary element 620 on the lamp 601 to switch the projected image pattern. Since there are several second light sources (e.g., 671, 672) having the different image patterns on the rotary tray 611, as the rotary tray 611 rotates, the second light sources 671, 672 thereon accordingly rotate and are respectively activated by the touch circuit 130 and driving circuit 120 as shown in FIG. 1A so as to present a different image related to the image pattern. The rest portions of the structure shown in FIG. 6B are identical to FIG. 6A, and those skilled in the art may conveniently infer to its implementation through the above-said descriptions which are herein omitted for brevity.

Figure 7A:
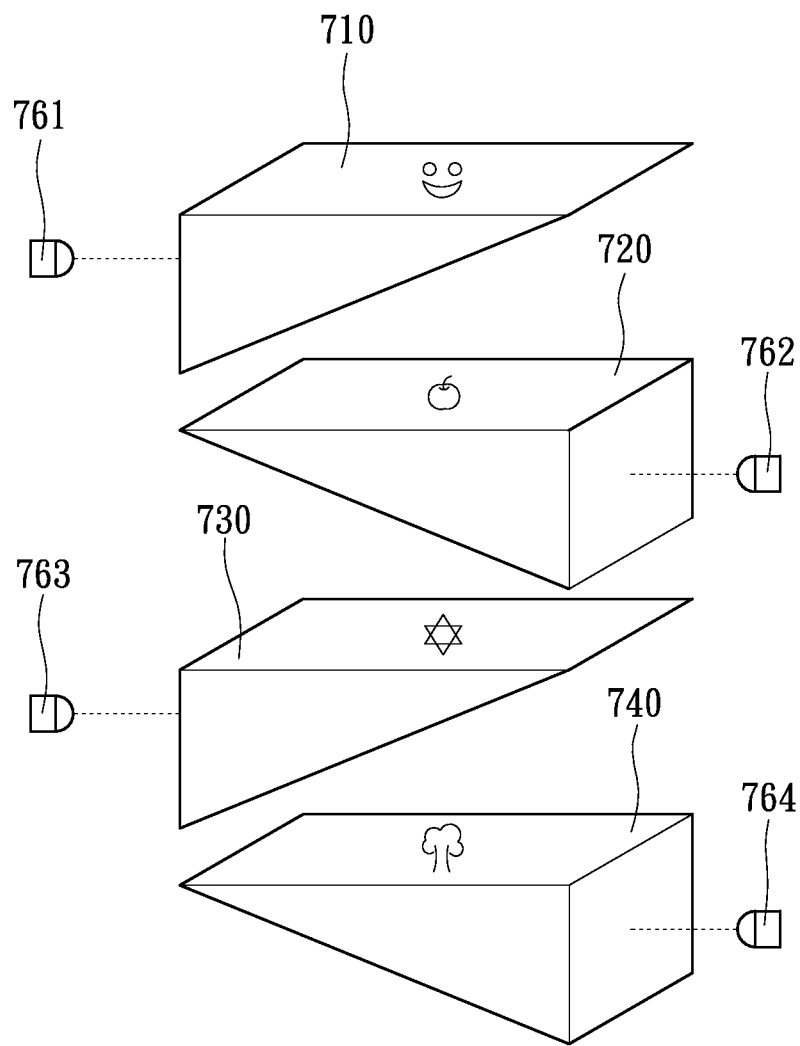
FIG. 7A shows a diagram of image pattern projection according to the present invention.

Refer subsequently to FIG. 7A, wherein a diagram of another image pattern projection according to the present invention is shown. In the present embodiment, multiple light guiding boards 710~740 are formed in a way of stack, with each having a gap between each of them, and the second light sources 761~764 are respectively installed on the side of the light guiding boards 710~740 thereby feeding light into the light guiding boards 710~740. Each of the light guiding boards 710~740 is configured with a different image pattern. When one of the second light sources 761~764 emits light, light enters into the side of a corresponding light guiding board 710~740 and a corresponding image pattern is then projected onto the lamp cover 194.

When only the second light source 761 on the side of the light guiding board 710 is activated and illuminates, since a gap exists between each of such light guiding boards 710~740, light will be totally reflected at the bottom side of the light guiding board 710 due to the existence of the gap between the light guiding boards 710, 720, but not entering to the light guiding board 720, until it encounters the image pattern on the light guiding board 710 and thus penetrates, so only the image pattern of the light guiding board 710 will be presented; on the other hand, when only the second light source 762 on the side of the light guiding board 720 is activated and illuminates, light will be also totally reflected in the light guiding board 720 due to the existence of the gap between the light guiding boards 720, 730, until it encounters the image pattern on the light guiding board 720 and thus penetrates the light guiding board 720 and the light guiding board 710, consequently only the image pattern of the light guiding board 720 will be shown. Therefore, the image patterns of the light guide boards 710-740 projected on the lamp cover may not be interferences.

Figure 7B:
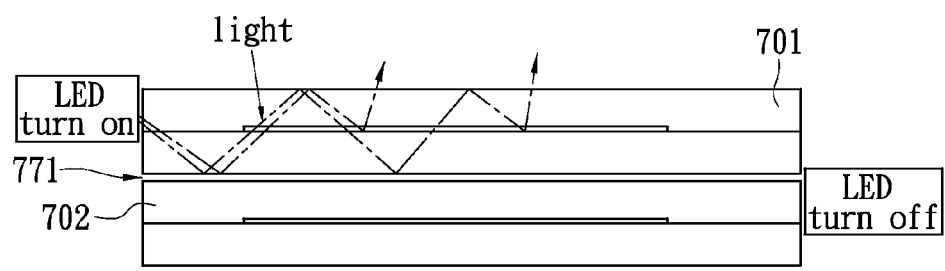
FIG. 7B shows a diagram of light paths of light guiding boards according to the present invention.
Figure 7C:
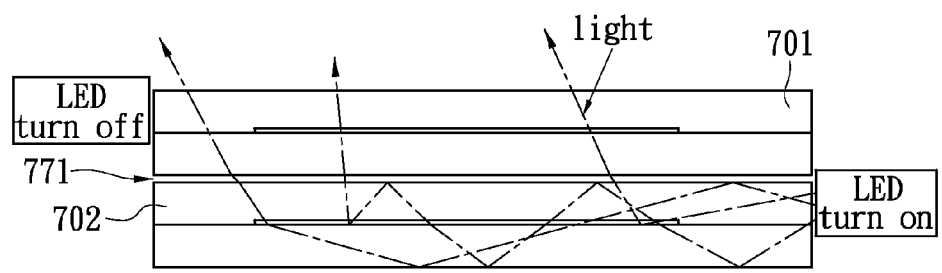
FIG. 7C shows a diagram of light paths of light guiding boards according to the present invention.

Please refer to FIG. 7B, which shows a diagram of light paths of light guiding boards according to the present invention. When only the LED light source corresponding to the upper layer light guiding module 701 is turned on and illuminates, since a gap 771 exists between each of light guiding modules 701, 702, with the result that when the predetermined light source corresponding the first guiding module (such as the upper layer light guiding module 701) is turned on, light will be totally reflected at the bottom side of the light guiding module 701 due to the existence of the gap between the light guiding modules 701, 702, but not entering to the second light guiding module (such as the lower layer light guiding module 702), until it encounters the image pattern on the light guiding module 701 and thus penetrates, so only the image pattern on the light guiding module 702 will be presented. Please refer to FIG. 7C, which shows a diagram of light paths of light guiding boards according to the present invention. When only the predetermined LED light source corresponding to the second light guiding module (such as the lower layer light guiding module 701) is activated and illuminates, light will be also totally reflected at the top side of the light guiding board 702 due to the existence of the gap between the light guiding modules 701, 702, until it encounters the image pattern on the light guiding module 702 and thus penetrates the light guiding module 702 and the light guiding module 701, consequently only the image pattern on the lower layer light guiding board 702 will be shown.

Besides, according to the descriptions with regards to FIG. 1A, the luminaire 100 may enable a dimming function with a mechanical way wherein the lamp cover 194 is rotatably connected onto the casing 196, and a user is allowed to adjust the luminance of the lamp as well as activates or deactivates the lamp 100 by rotating the casing 196. The driving circuit 120 adjusts the luminance of the first light source 150 based on the rotation position of the lamp cover 194. When the lamp cover 194 is rotated from a start position, the driving circuit 120 turns on the first light source 150 and adjusts the brightness of the first light source 150 in accordance with the rotation position of the lamp cover 194; as the lamp cover 194 is rotated and reaches a lower limit position, the driving circuit 120 will turn off the first light source 150.

Figure 8:
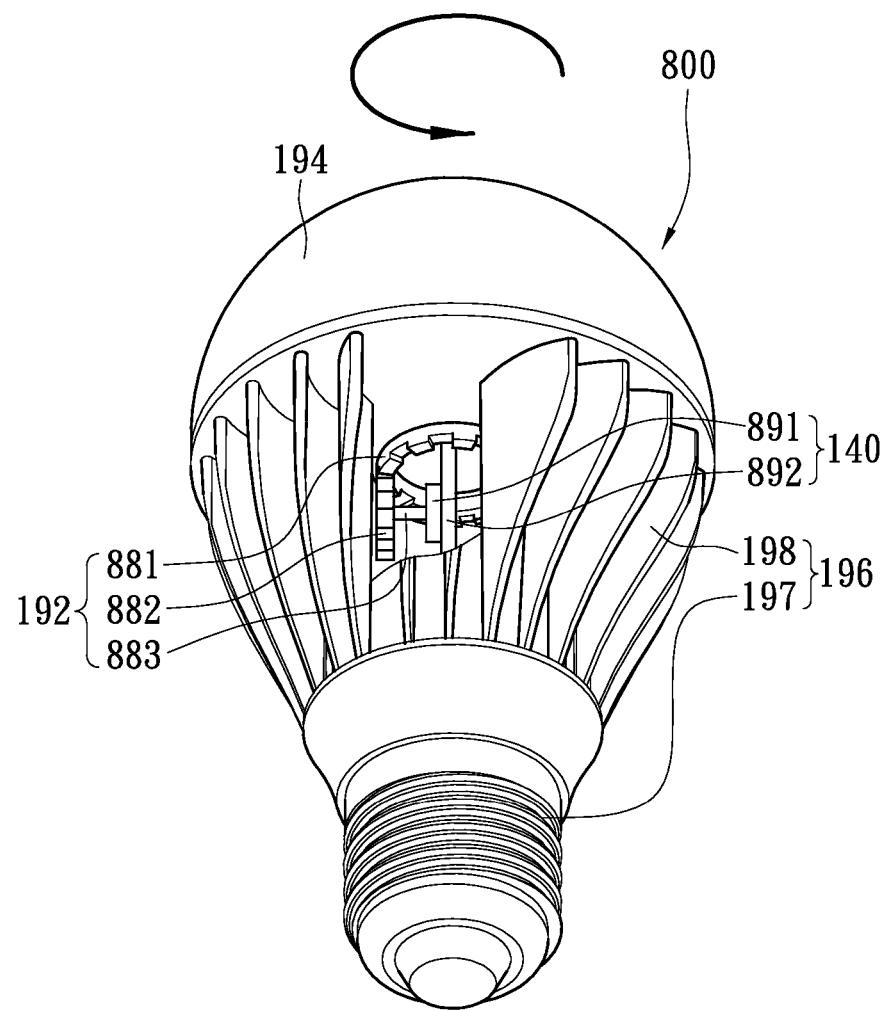
FIG. 8 shows a diagram for the dimming device and dimming mechanism of the luminaire according to the present invention.

Refer conjunctively to FIG. 8, wherein a structural diagram for the dimming device 140 and the dimming mechanism 192 of the lamp 800 according to the present invention is shown. The dimming device 140 is coupled to the dimming mechanism 192 and the driving circuit 120, while the dimming mechanism 192 is further coupled to the lamp cover 194. The dimming device 140 together with the dimming mechanism 192 may generate an adjustment signal according to the rotation position of the lamp cover 194 thus altering the luminance of the luminaire by the driving circuit 120 based on such an adjustment signal.

The dimming device 140 has a variable resistor 891 which is installed on a printed circuit board 892. The dimming device 140 converts the resistance value of the variable resistor 891 into a voltage signal or a current signal to the driving circuit 120 such that the driving circuit 120 may accordingly adjust the luminance of the first light source in the lamp 800. The dimming mechanism 192 mainly comprises a lens gear 881, a drive gear 882 and a drive shaft 883, wherein the lens gear 881 is installed inside the casing 196 and connected to the lower edge of the lamp cover 194. The drive gear 882 is installed inside the casing 196 and engaged in teeth with the lens gear 881. The drive shaft 883 is connected to the drive gear 882 and the variable resistor 891 so as to adjust the variable resistor 891. The lens gear 881 may be in a shape of arc, for example, and rotate together with the lamp cover 194 thus further bringing the drive gear 882 to rotate. Through the drive shaft 883, the rotation of the drive gear 882 allows to modify the resistance value of the variable resistor 891.

Additionally, to prevent damages to the dimming mechanism 192 and the dimming device 140 because of excessive rotation by the user, it is possible to respectively dispose two blocking parts (not shown) at both ends of the lens gear 881 in order to limit the rotation angle of the lens gear 881. When the lens gear 881 is rotated to the blocking part (i.e., the aforementioned lower limit position), it may be stopped. Alternatively, an arc-shaped guiding track (not shown) may be installed inside the casing 196, and the lamp cover 194 may be configured with a sliding part (not shown) for sliding along such an arc-shaped guiding track; when the lamp cover 194 reaches the terminal of the arc-shaped guiding track (i.e., the aforementioned lower limit position), it may be stopped.

The driving circuit 120 adjusts the brightness of the first light source 150 based on the resistance value of the valuable resistor 891. In other word, by using the dimming device 140 and the dimming mechanism 192, the user is allowed to adjust the luminance of the lamp 100 by rotating the lamp cover 194. It should be noted that the dimming device 140 and the dimming mechanism 192 are not limited to what are shown in FIG. 8. For example, the variable resistor 891 in the dimming device 140 may be implemented with a resistor network and the dimming mechanism 192 may be embodied by means of a clip, such that, as the lamp cover 194 rotating, the clip may engage with a different pin of the resistor network thereby modifying the resistance value thereof. Through the descriptions of the aforementioned embodiment, those skilled in the art may infer to other embodiments which will be herein omitted for brevity.

Besides, it should be noted that, in another embodiment of the present invention, the driving circuit 120 may use AC power or DC power, or both, depending on design requirements. In case that the driving circuit 120 may use only DC power, it needs not to be coupled to the ACIN. Suppose AC power is applicable for the driving circuit 120, the driving circuit 120 may be directly coupled to the AC power ACIN and convert the AC power ACIN into DC power for driving DC LEDs, or else directly apply AC power ACIN to drive AC LEDs. Through the descriptions of the aforementioned embodiment, those skilled in the art may infer to other embodiments which will be herein omitted for brevity.

Also, it should be noted that the coupling relationships between the above-said components include direct connection or indirect connection, or both, so long as the required signal transfer function may be effectively achieved and the present invention is not limited thereto. The technical means applied in the aforementioned embodiments may be utilized alone or in combination and the present invention is not limited thereto.

In summary, the present invention is installed with the second light source in the luminaire for providing the patterned light, thereby projecting the image onto the lamp cover of the luminaire. Also, in conjunction with mechanical design and the touch circuit, a user is allowed to adjust the brightness of the luminaire and switch or deactivate the image related to the image pattern through the user's touch, so as to provide convenience for directly adjusting the brightness of the luminaire and displaying message thereon.

Although the preferred embodiments of the present invention have disclosed as above, the present invention is by no means limited to such disclosed embodiments. Changes and modifications to such embodiments may be made by those skilled in the art without departing from the scope of the present invention. Therefore the scope of the present invention to be legally protected should be defined by the following claims.

What is claimed is:

1. A luminaire, comprising:
    a first light source providing an illumination light;
    a second light source passing through at least one image pattern for providing a patterned light;
    a lamp cover covering the first light source and the second light source, and an image related to the image pattern being projected on to the lamp cover by the second light source; and
    a driving circuit coupled to the first light source and the second light source and selectively driving at least one of the first light source and the second light source for providing the illumination light and/or the patterned light;
    wherein the lamp cover has a means connected to the driving circuit so that, the driving circuit can adjusts a luminance of the first light source in accordance with a rotation position of the lamp cover.

2. The luminaire according to claim 1, wherein the second light source comprises:
    at least one light emitting diode die; and
    a package structure having the image pattern corresponding to the lighting emitting diode die, and the light emitting diode die being packaged therein.

3. The luminaire according to claim 1, further comprising:
    a rotary tray having the image pattern and located above the second light source, position of the image pattern being corresponding to the second light source; and
    a rotary element connected to the rotary tray via a rotating shaft for rotating the rotary tray to switch location of the image pattern.

4. The luminaire according to claim 3, wherein the luminaire further comprises a casing, and the rotary element is partially exposed to outside of the casing.

5. The luminaire according to claim 1, further comprising:
    a rotary tray provided for disposing the second light source, wherein the image pattern corresponding to the second light source are formed on a top plane of the second light source; and
    a rotary element connected to the rotary tray via a rotating shaft for rotating the rotary tray to switch location of the second light source.

6. The luminaire according to claim 5, wherein the luminaire further comprises a casing, and the rotary element is partially exposed to outside of the casing.

7. The luminaire according to claim 1, further comprising a light guiding board, wherein the light guiding board has the image pattern corresponding to the second light source, and the second light source is installed on one side of the light guiding board.

8. The luminaire according to claim 1, further comprising:
    a casing having a heat sink; and
    a touch circuit electrically connected to the casing for receiving a touch signal, and the touch circuit coupled to the driving circuit for selectively turning on at least one of the first light source and the second light source based on the touch signal;
    wherein the driving circuit drives the first light source to provide the illumination light or drives the second light source to project the patterned light having the image onto the lamp cover.

9. The luminaire according to claim 1, further comprising:
    a dimming device coupled to the driving circuit and having at least one variable resistor; and
    a dimming mechanism coupled to the dimming device and the lamp cover for adjusting a resistance value of the variable resistor based on the rotation position of the lamp cover;
    wherein the driving circuit adjusts the luminance of the first light source in accordance with the resistance value of the variable resistor.

10. The luminaire according to claim 9, wherein the dimming mechanism comprises:
    a lens gear connected to the lamp cover;
    a drive gear engaged in teeth with the lens gear; and
    a drive shaft connected to the drive gear and the variable resistor;
    wherein the drive gear is driven by the lamp cover via the lens gear to adjust the resistance value of the variable resistor.

11. The luminaire according to claim 1, wherein the driving circuit stops driving the first light source as the lamp cover being rotated to a lower limit position.

12. The luminaire according to claim 1, wherein the driving circuit is a multi-channel driving control circuit for respectively driving the first light source or the second light source.

13. The luminaire according to claim 12, wherein the first light source and the second light source are composed of light-emitting diodes.

14. The luminaire according to claim 1, further comprising a power management circuit having a power failure detecting circuit for detecting an external power supply status, a power converter circuit for converting AC power to DC power and a rechargeable battery, wherein the power management circuit provides power to the driving circuit through the power converter circuit responsive to the external power supply on and provides power to driving circuit through the rechargeable battery responsive to the external power supply off.

15. The luminaire according to claim 14, wherein the power management circuit further comprises a charging circuit coupled to the rechargeable battery for charging the rechargeable battery, wherein the charging circuit is powered by the power converter circuit.

16. The luminaire according to claim 15, wherein the power management circuit further comprises a control circuit coupled to the power failure detecting circuit, the charging circuit, the rechargeable battery and the power converter circuit for controlling operations of the power management circuit.

17. A luminaire, comprising:
a first light source providing an illumination light;
a second light source passing through at least one image pattern for providing a patterned light;
a lamp cover covering the first light source and the second light source, and an image related to the image pattern being projected on to the lamp cover by the second light source;
a touch circuit electrically connected to a casing for receiving a touch signal, and at least one of the first light source and the second light source being selectively turned on based on the touch signal for providing the illumination light and/or the patterned light respectively; and
a driving circuit coupled to the first light source and the second light source;
wherein the lamp cover has a means connected to the driving circuit so that, the driving circuit can adjusts a luminance of the first light source in accordance with a rotation position of the lamp cover.

18. The luminaire according to claim 17, wherein the touching circuit is electrically connected to a heat sink or a lamp base of the casing for receiving the touch signal.

19. The luminaire according to claim 17, further comprising:
a rotary tray having the image pattern, wherein the rotary tray is installed in the casing and located above the second light source; and
a rotary element connected to the rotary tray via a rotating shaft for rotating the rotary tray to switch location of the image pattern.

* * * * *